United States Patent [19]

Ackeret

[11] Patent Number: 4,640,415
[45] Date of Patent: Feb. 3, 1987

[54] CONTAINER HAVING AUTOMATIC DOORS AND FOR ACCOMMODATING DATA STORAGE MEDIA

[75] Inventor: Peter Ackeret, Küsnacht, Switzerland

[73] Assignee: IDN Inventions and Development of Novelties AG, Chur, Switzerland

[21] Appl. No.: 570,912

[22] Filed: Jan. 16, 1984

[30] Foreign Application Priority Data

Jan. 15, 1983 [DE] Fed. Rep. of Germany ....... 3301203
Aug. 29, 1983 [EP] European Pat. Off. ........ 83108481.9

[51] Int. Cl.$^4$ .................... B65D 85/676; B65D 85/57
[52] U.S. Cl. .................................... 206/387; 206/444; 312/15
[58] Field of Search ............... 206/309, 311, 387, 425, 206/444; 220/334; 312/8–19

[56] References Cited

U.S. PATENT DOCUMENTS

| Re. 30,184 | 1/1980 | Ackeret | 206/387 |
|---|---|---|---|
| 2,269,637 | 1/1942 | Polkosnik . | |
| 2,278,529 | 4/1942 | Beder | 312/12 |
| 2,567,966 | 9/1951 | Purcell | 312/17 |
| 2,589,593 | 3/1952 | Anderson et al. . | |
| 2,720,438 | 10/1955 | Musick | 312/12 |
| 2,804,197 | 8/1957 | Popkess et al. . | |
| 3,561,004 | 2/1971 | Kozu et al. . | |
| 3,582,168 | 6/1971 | Bian et al. | 312/19 |
| 3,677,396 | 7/1972 | Staar . | |
| 3,811,745 | 5/1974 | Cylke | 312/13 |
| 3,836,222 | 9/1974 | Kuntze | 312/319 |
| 3,866,990 | 2/1975 | McRae | 312/15 |
| 3,893,585 | 7/1975 | Morrison et al. | 220/22.6 |
| 3,899,229 | 8/1975 | Ackeret | 312/319 |
| 3,904,259 | 9/1975 | Hoffmann et al. | 312/111 |
| 3,926,310 | 12/1975 | Ackeret | 206/387 |
| 3,994,550 | 11/1976 | Ackeret | 312/319 |
| 3,994,551 | 11/1976 | Ackeret | 312/319 |
| 3,995,737 | 12/1976 | Ackeret | 206/387 |
| 3,995,921 | 12/1976 | Ackeret | 312/12 |
| 4,046,255 | 9/1977 | Ackeret | 206/387 |
| 4,082,386 | 4/1978 | Beasley, Jr. | 312/204 |
| 4,113,091 | 9/1978 | Ackeret | 206/387 |
| 4,162,112 | 7/1979 | Konkler | 312/15 |
| 4,191,292 | 3/1980 | Schweizer | 206/387 |
| 4,275,943 | 6/1981 | Gelardi et al. | 312/319 |
| 4,293,266 | 10/1981 | St. Lawrence et al. | 414/411 |
| 4,387,802 | 6/1983 | Shearing et al. . | |
| 4,399,913 | 8/1983 | Gelardi et al. | 206/387 |
| 4,444,314 | 4/1984 | Jacobsson | 206/425 |

FOREIGN PATENT DOCUMENTS

| 344416 | 11/1977 | Austria . | |
|---|---|---|---|
| 0086275 | 8/1983 | European Pat. Off. . | |
| 0087765 | 9/1983 | European Pat. Off. . | |
| 1131026 | 6/1962 | Fed. Rep. of Germany | 312/15 |
| 1141092 | 12/1962 | Fed. Rep. of Germany . | |
| 1958291 | 4/1967 | Fed. Rep. of Germany . | |
| 1797278 | 8/1971 | Fed. Rep. of Germany . | |
| 2033388 | 10/1971 | Fed. Rep. of Germany . | |
| 2149690 | 4/1973 | Fed. Rep. of Germany . | |
| 2248408 | 1/1974 | Fed. Rep. of Germany . | |
| 2307410 | 8/1974 | Fed. Rep. of Germany . | |
| 7435482 | 5/1975 | Fed. Rep. of Germany . | |
| 7917351 | 5/1980 | Fed. Rep. of Germany . | |
| 2914415 | 6/1980 | Fed. Rep. of Germany . | |
| 3106511 | 9/1982 | Fed. Rep. of Germany . | |
| 2917806 | 11/1983 | Fed. Rep. of Germany . | |
| 1343653 | 10/1963 | France . | |
| 2127857 | 10/1972 | France . | |

Primary Examiner—William Price
Assistant Examiner—Jimmy G. Foster
Attorney, Agent, or Firm—Jeffrey H. Ingerman

[57] ABSTRACT

A container for accommodating data storage media such as video cassettes is disclosed. The container has a slider member that carries the storage media and moves out of the housing. The slider member allows the cassette to be grasped freely after ejection of the slider member from the housing. One or more door elements connected to the housing are controlled by the movement of the slider member between open and closed positions. The media are protected by the door element(s) being closed when the slider member is inserted into the housing.

12 Claims, 15 Drawing Figures

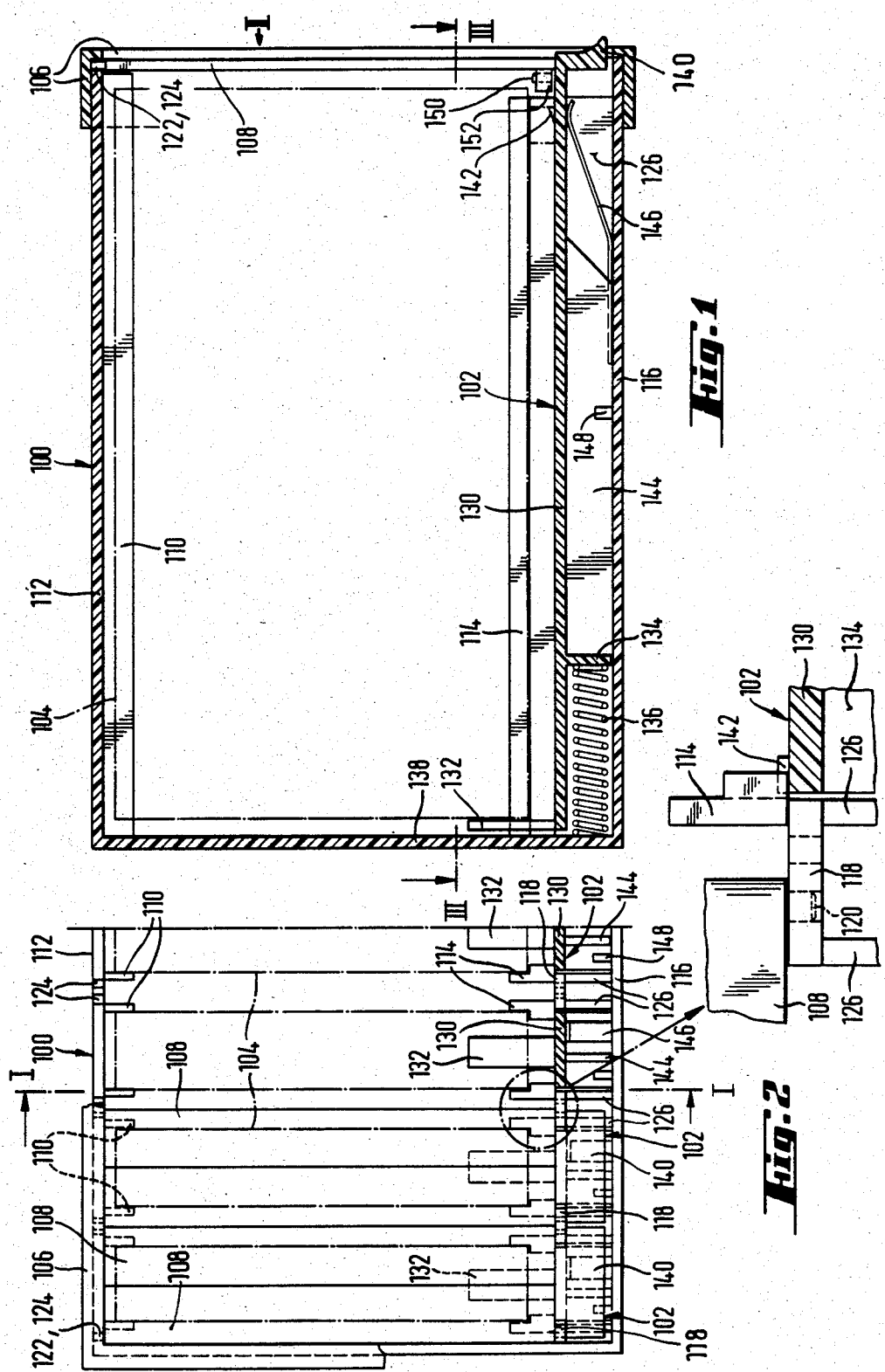

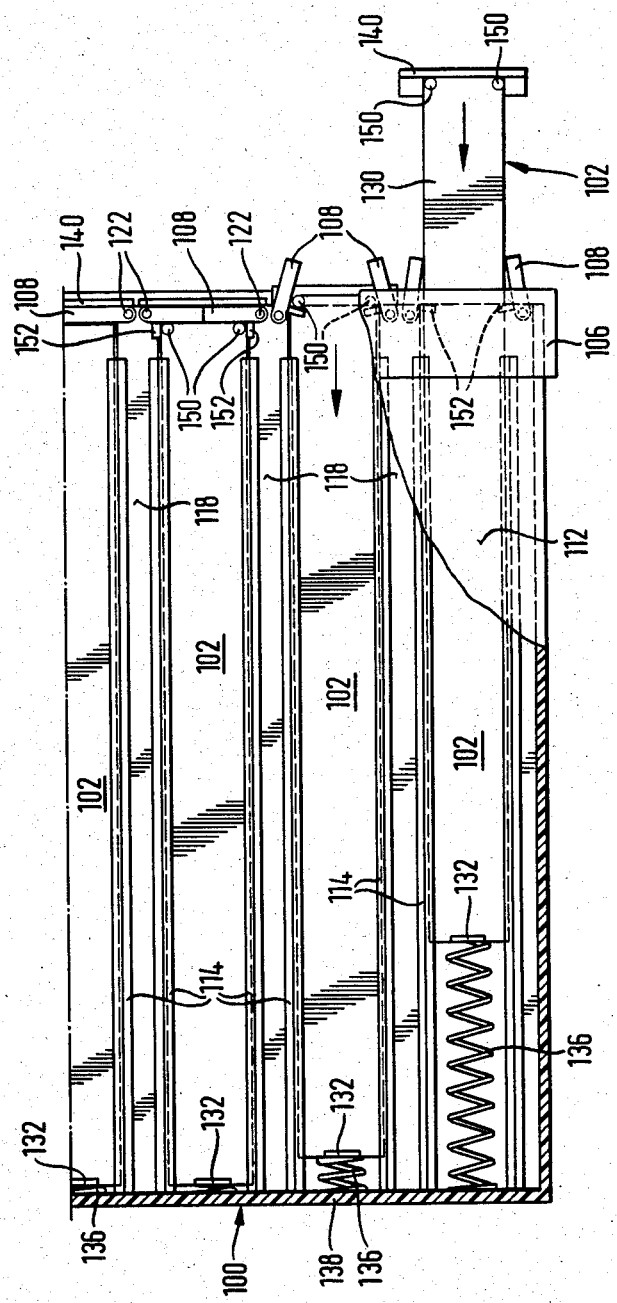

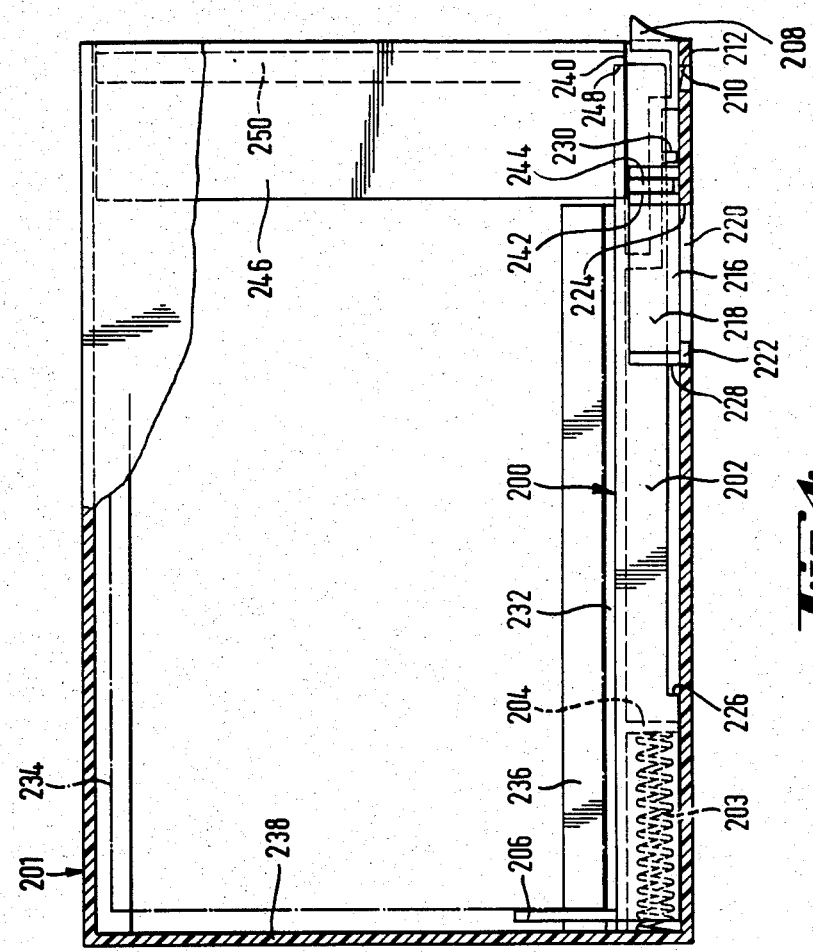
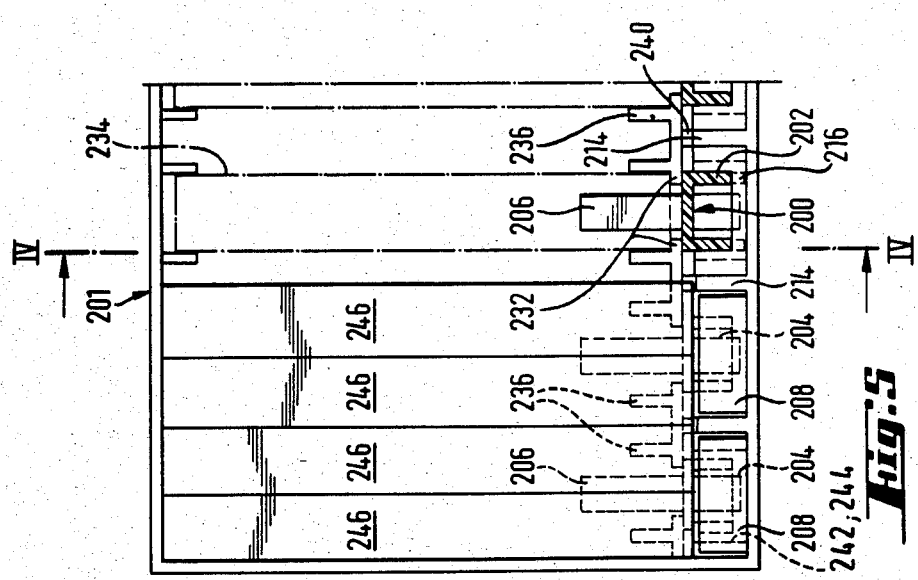

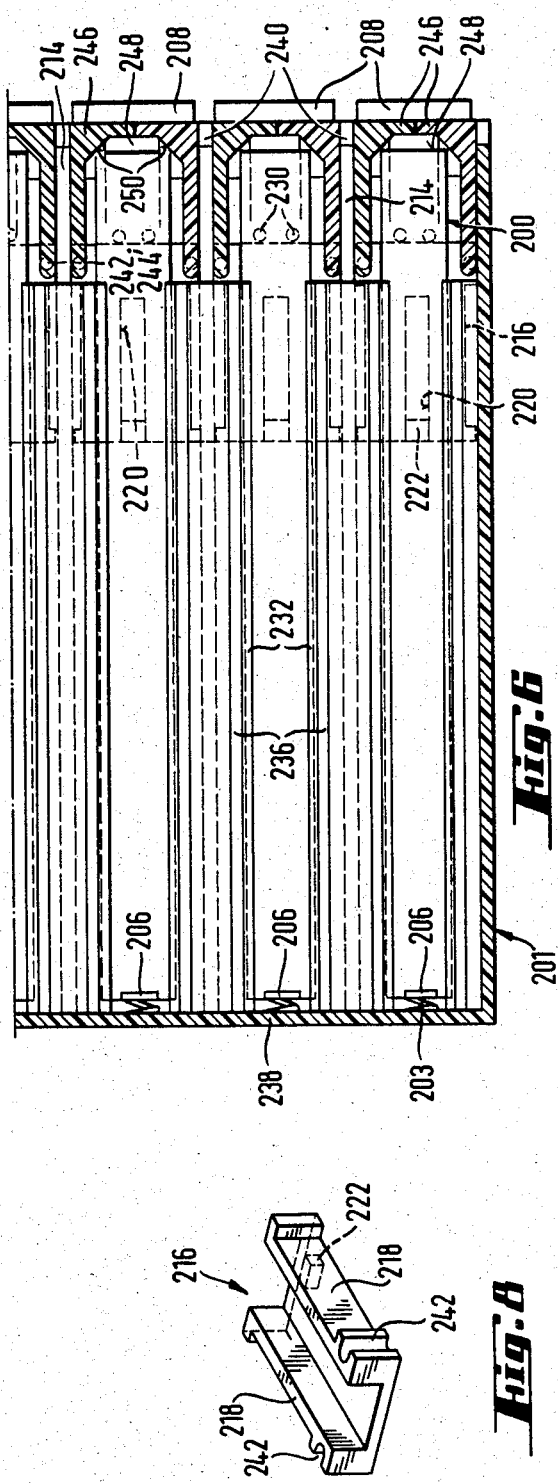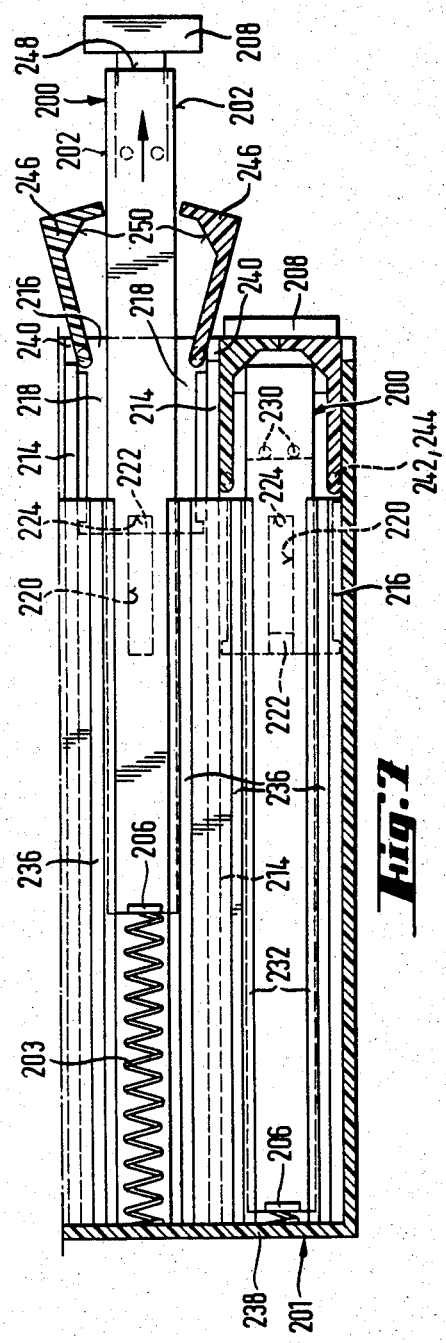

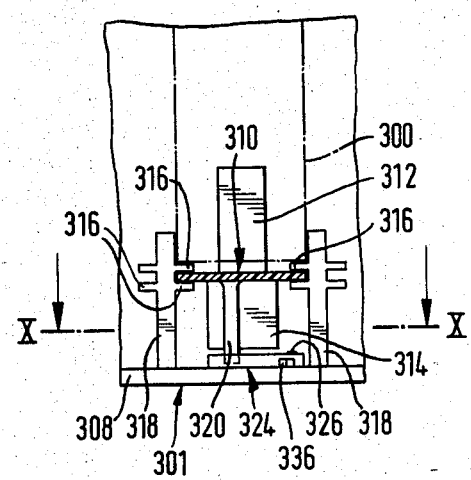
Fig. 9
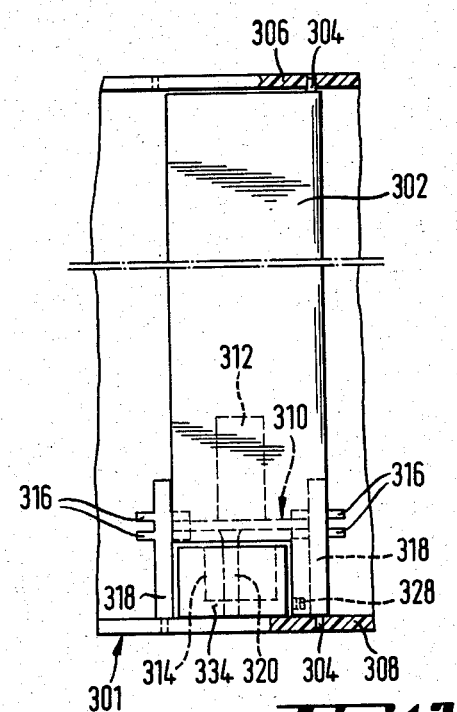
Fig. 12
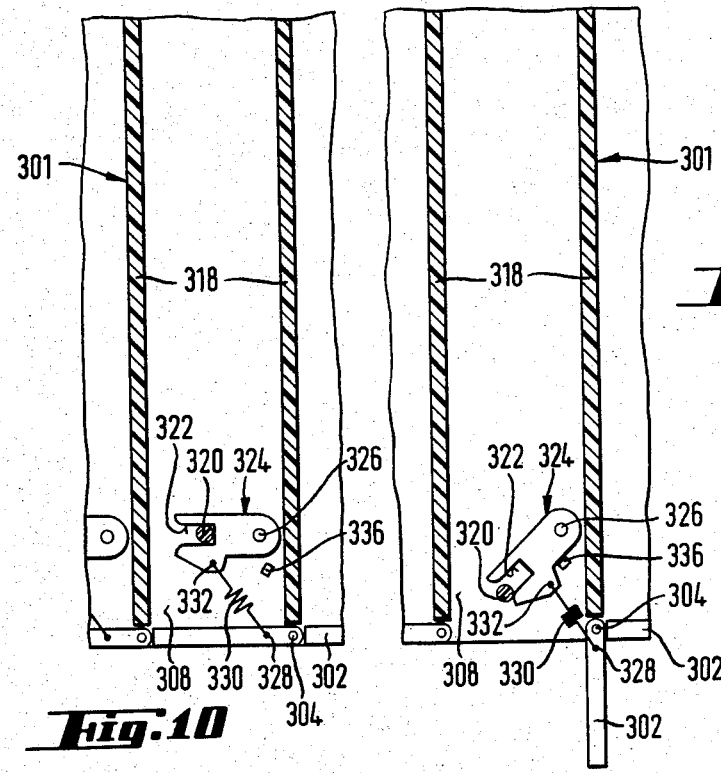
Fig. 10
Fig. 11

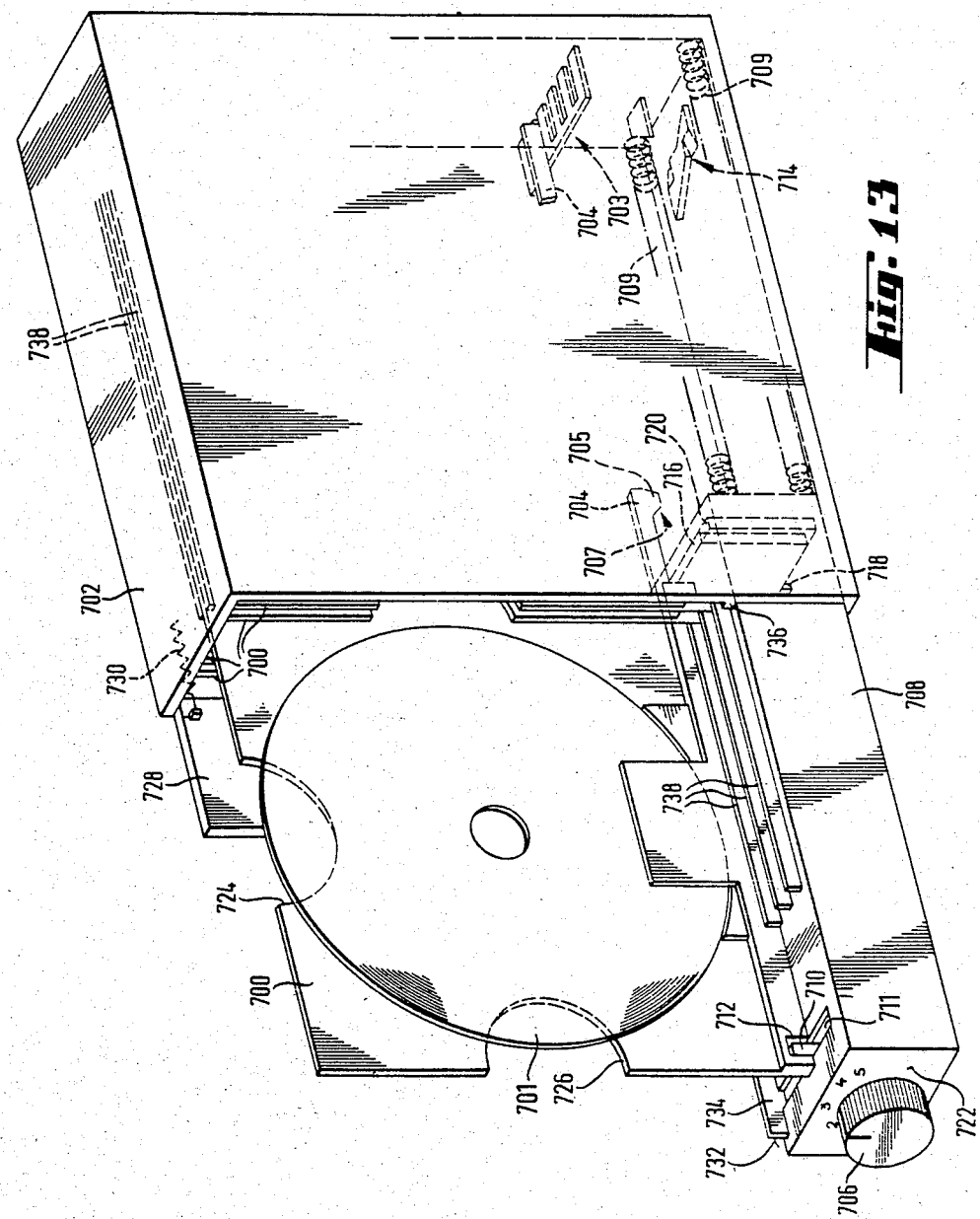

CONTAINER HAVING AUTOMATIC DOORS AND FOR ACCOMMODATING DATA STORAGE MEDIA

BACKGROUND OF THE INVENTION

The invention relates to a container for accommodating data storage media such as magnetic tape cassettes or discs.

A known container for storing such media is shown in West German Patent Document PS 22 48 408. That container, used for compact cassettes, has a slider member that moves in and out of the housing. The cassettes ride on the slider member. On the front face of the slider member, there is a plate which closes the housing when the slider member is inserted. This plate also can serve as a carrier for a label. The slider member has free spaces so that each compact cassette can be grasped by its edges and lifted over the front plate of the slider member when the slider member has been ejected by a spring arrangement from the housing.

Because the surface dimensions of other types of data storage media, such as video cassettes or compact discs, are greater than a hand span, they are best grasped by gripping their large surfaces rather than their edges. It is desirable to be able to remove the data storage medium while such data storage medium is in alignment with the direction of outward movement of the slider member. A front wall on the slider member, such as in the '408 device, could prevent such removal.

SUMMARY OF THE INVENTION

The present invention provides a container for data storage media that enables the media to be conveniently grasped and removed or inserted. In addition, the data storage media are protected from dust when the slider member is inserted. The container of the present invention does not require complicated manipulation by the user.

Broadly, the container of this invention may be defined as follows:

A container for accommodating data storage media comprising:
- (a) a housing having a base wall, a top wall, two side walls, a rear wall, and an open front face opposite the rear wall;
- (b) a slider member slidably movable into and out of the housing for holding at least one data storage medium, the data storage medium being accessible for insertion or removal when the slider member is out of the housing;
- (c) locking means for retaining the slider member in the housing;
- (d) biasing means for ejecting the slider member from the housing when the locking means is released; and
- (e) door means for closing the open front face of the housing wherein the door means is closed by the slider member being inserted into the housing and is opened by the slider member being ejected from the housing.

Accordingly, in this invention when the slider member is inserted, the storage chamber for the data storage medium is protected from dust by the door element or elements. The actuation of the door element or elements is controlled by the movement of the slider member or the data storage medium into or out of the housing. Positive guiding, coupling with an auxiliary spring, or other structural modifications are possible.

BRIEF DESCRIPTION OF THE DRAWINGS

To facilitate further discussion of the invention, the following drawings are provided, in which:

FIG. 1 is a side sectional view of a first embodiment of a container according to the invention with the slider member inserted;

FIG. 2 is a partial front view of a portion of the container of FIG. 1;

FIG. 3 is a top cross-sectional view of a portion of the container of FIG. 1;

FIG. 4 is a side sectional view of a second embodiment of the invention;

FIG. 5 is a front, partially broken view of the container of FIG. 4;

FIG. 6 is a top cross-sectional view of a portion of the container of FIG. 4 with the housing closed;

FIG. 7 is a top cross-sectional view of a portion of the container of FIG. 4 but with the slider member ejected;

FIG. 8 is a perspective view of a component of the container of FIG. 4;

FIG. 9 is a front partial view of a third embodiment;

FIGS. 10 and 11 are top partial views of the container of FIG. 9 in the closed and open positions, respectively;

FIG. 12 is a front view of the container of FIG. 9 in a closed position;

FIG. 13 is a perspective view of a fourth embodiment with the container open;

DETAILED DESCRIPTION OF THE INVENTION

Figure 14:
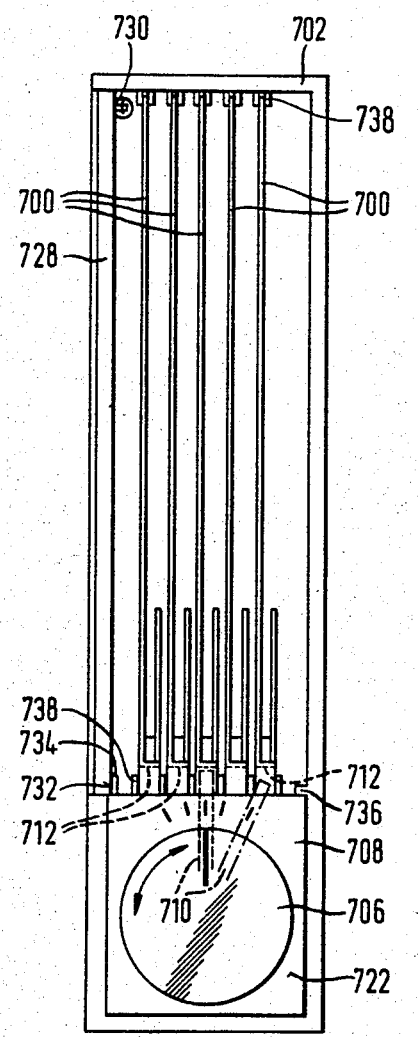
FIG. 14 is a front view of the container of FIG. 13.

Referring to FIGS. 1 to 3, a substantially box-shaped housing 100 accommodates a number of transporter slider members 102, each for holding one video cassette 104. The front face of the housing is surrounded by a frame 106.

The housing is divided into compartments for the individual slider members and cassettes. These compartments are defined by ribs 110, formed integrally with top wall 112 of the housing 100, and by corresponding ribs 114, which project upwardly in relation to base wall 116 of the housing 100. Ribs 114 are stepped (see FIG. 2). A cassette 104 rests in the steps of the two ribs 114 defining each compartment. Thus, taken in pairs, ribs 114 define guide channels for each slider member assigned to a particular compartment. Ribs 114 are supported by transverse ribs 118, which in turn are supported by support ribs 126. Ribs 126 are formed integrally between transverse ribs 118 and base wall 116 of the housing. Ribs 110, 114, 118, and 126 all extend perpendicularly to the open front face of the housing.

Each individual compartment for holding a cassette has a pair of door elements 108 for holding the cassette in the compartment and for protection against dust. The upper surfaces of transverse ribs 118 are provided with bores that serve as bearings for lower pivot pins 120 of the door elements 108. At the top, door elements 108 have corresponding pivot pins 122, which are received in U-shaped recesses 124 in the front edge of the top wall 112. Top wall 112 is covered by the frame 106, which is put on after the door elements have been closed.

The housing, the frame, and the door elements are made from molded plastic as is the slider member 102. Each slider member comprises a base plate 130, extending parallel to the base wall 116 of the housing 100, a transport arm 132, extending upwardly perpendicular to the base plate 130 and parallel to the open front of the housing, and a pressure arm 134, extending downwardly perpendicular to the base plate and parallel to the open front of the housing. Transport arm 132 is positioned at the rear end of the slider member and pushes a cassette 104 outwardly. One end of a helical compression spring 136 is supported against rear wall 138 of the housing and the other end against the pressure arm 134.

At the front end of the base plate 130 is a button 140, which can be deflected resiliently downwardly. When so deflected, button 140 allows removal of a detent 142 in base plate 130 out of a catch in rib 114. As a result, the slider member is released and ejected by spring 136. The deflectable region of the base plate 130 terminates at a support plate 144, which extends downwardly perpendicular from the base plate 130. The support plate is located off-center in relation to each compartment because it is necessary to leave a space next to support plate 144 for a resetting spring 146. A pin 148 formed integrally with the base of the housing limits the outward travel of the slider when the pressure arm 134 contacts pin 148 as the slider moves out of the housing. Control pins 150 are formed integrally with the upper side of the base plate 130. These are directly behind the door elements 108 when the slider is in the housing (FIG. 3, top). Control pins 150 exert a torque on the door elements causing the door elements to open when the slider member is ejected. The ejection path of the slider member is long enough for the cassette to be transported out of the housing for a sufficient distance in front of the door elements so that the cassette can easily be grasped (FIG. 3, bottom). When the slider member is reinserted (FIG. 3, center), the control pins 150 hit stop tongues 152 on the door elements and exert a torque causing the door elements to close. The slider member is pushed into the housing by pushing button 140. When the button is released, the slider member is locked into the housing.

The second embodiment according to FIGS. 4 to 8 differs from the first embodiment in the construction and arrangement of the door elements and the slider member. Unless otherwise indicated, the housing 201 corresponds essentially to the housing of the first embodiment.

The slider member 200 comprises a base plate from which a support plate 202 projects downwardly on each side. A helical compression spring 203 acts on a pressure arm 204, and a transport arm 206 pushes the data storage medium, such as a video cassette, outwardly when the slider member is unlocked. An upwardly movable unlocking button 208, formed integrally with the base plate of the slider member, can be resiliently deflected, thereby lifting a detent 210 out of a catch 212. Catch 212 is a recess in the base of the housing.

Vertical ribs 214 project upwardly from the base of the housing. A carriage 216, shown in perspective in FIG. 8, is guided between ribs 214. Carriage 216 has a U-shaped cross-section. The slider member is guided between arms 218 of carriage 216. The slider member 200 and the carriage 216 can be moved relative to one another like the parts of a telescope. The outward travel of the carriage is limited by a stop 222, which runs in a slot 220 in the base of the housing, when stop 222 hits edge 224 of the slot. The slider member 200 has stops 226, formed integrally with the support plates 202, which hit end edge 228 of the carriage. Resetting lugs 230, formed integrally with the underside of button 208, push the carriage back into the inserted (or storage) position, shown in FIG. 6, when the slider member is reinserted.

Transverse ribs 232 on the housing engage over two adjacent slider members 200. Retaining ribs 236 of transverse ribs 232 support a cassette 234. Ribs 232 and 236 extend forward from rear wall 238 of the housing but do not extend as far as the forward area (right side of FIG. 6) of the slider member and carriage. In that forward area the slider member and carriage are supported at their sides only by the vertical ribs 214 in the inserted position (FIGS. 4 and 6). A step 240 is taken out of each of the front edges of vertical ribs 214. The carriage 216 has outwardly directed bearing recesses 242, which, when the carriage is in the ejected position, are positioned next to steps 240. In these bearing recesses are seated bearing pins 244 of a door element 246, each door element having an angular cross-section.

In the storage position, door elements 246 are kept shut by the vertical ribs 214. When the locking mechanism is released, front edge 248 of the slider member 200 hits the internal sloping surfaces 250 of the door elements 246. A force is thereby exerted on surfaces 250 and on the carriage, and a torque is exerted on the door elements. When the front edge 248 first contacts the sloping surfaces 250, only the carriage moves along (from left to right in FIGS. 6 and 7) and the door elements do not swing open. It is only when stop 222 contacts edge 224 and, at the same time, the steps 240 allow the door elements to pivot, that the torque becomes effective and the door elements open, as shown in FIG. 7. The process is reversed when reinserting the slider member, the resetting lugs 230 transferring the force to the carriage 216. The carriage 216 and door element 246 thus form a common assembly or "door arrangement."

In the third embodiment according to FIGS. 9 to 12, only one door element 302 is provided for each compartment of a container holding a video cassette 300. Door element 302 is mounted in top wall 306 of housing 301 and in base wall 308 of housing 301, with bearing pins 304 arranged so that door element 302 pivots about a vertical axis. The slider member has a base plate 310, a transport arm 312, and a pressure arm 314, all having functions analogous to those of the similar parts in the first and second embodiments. The base plate 310 is guided between rails 316 on vertical ribs 318 on the housing 301.

A control pin 320 projects downwardly from the base plate 310 of the slider member and into a control slot 322 of a lever 324, which can be pivoted about a bearing pin 326 formed integrally with the base wall 308 of the housing. A helical tension spring 330 is connected at one end to a pin 328 located on the internal side of the door element. The spring is fastened at its other end, at 332, to the lever 324.

In bringing the slider member to the closed position (FIG. 10), the control pin 320 pivots the lever 324 in a clockwise direction and spring 330 transfers a torque to the door element 302 swinging it shut. When the slider member is released by actuation of button 334 (FIG. 12), the slider member presses against the door element, thus opening the container. The control pin 320 then pivots the lever 324 in a counter-clockwise direction (FIG. 11) so that the bias of the spring 330 is reduced until it finally acts like a rod to open the door element. The open position of lever 324 is defined by a stop 336 on the base wall 308 of the housing. When the slider member is inserted into the housing the process proceeds in reverse. The use of a spring involves fewer tolerance problems than if a rigid transfer rod were used, although the use of a rigid rod is possible.

Figure 15:
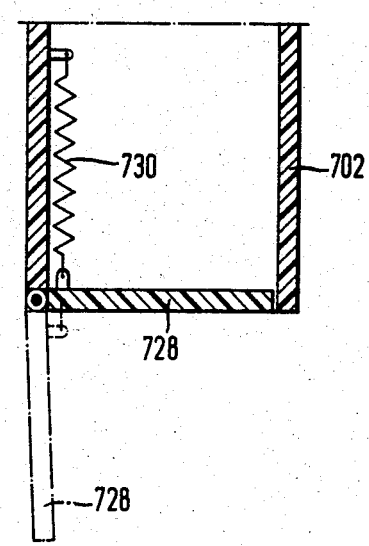
FIG. 15 is a detail view of the front region of the housing of the container of FIG. 13.

A fourth embodiment is shown in FIGS. 13 to 15. The container of this embodiment is designed for the storage of digital recording discs, for example, the so-called "compact discs" or "video discs." In a container for storing such discs, it is desirable for the discs to be housed in a stack as close together as possible to save space. However, each individual disc should be sufficiently easy to find and remove. These features are provided by the container of this embodiment. Each individual disc is accommodated in a holder 700. Several holders 700 are provided next to one another in a common housing 702. All the holders are accommodated in a common slider member 708. Slider member 708 has a selector mechanism, such as rotatable selector knob 706, which causes one holder to be carried out with the slider member while the other holders remain in the housing when the slider member is ejected.

All the holders 700 are guided so that they can slide into and out of the housing by means of upper and lower rails 738 on the housing and slider member, respectively. A locking device 703 is formed integrally with the inner face of the rear wall of the housing opposite the opening in the housing. The locking device 703 has a comb-like construction with locking openings for engaging locking projections 705 of locking arms 704 of each holder. Locking arms 704 are resiliently deformable in a vertical direction. The resilient character of the arms 704 and the locking sloping surface 707 of the projections 705 are designed so that, when the slider member is ejected from the housing, all of the holders except the holder that has been selected by selector knob 706 are retained in the housing. The selected holder is coupled in a positive-locking manner with the slider member, as described below. An ejection spring arrangement 709 is constructed so that the locking forces on the selected holder are overcome and the selected holder can be carried out of the housing by the slider member.

The selector knob 706 is rotatably mounted in front wall 722 of the slider member and can be turned to as many positions as there are holders 700. The selector knob shaft carriers a radial coupling arm 710 in the interior of the slider member, which extends through a slot 711 in the upper side of the slider member. Coupling arm 710 engages a coupling cut-out portion 712 of the holder that has been selected according to the angular position of the selector knob. As a result, the holder selected is coupled with the slider member and is carried along with the slider member when it is ejected. The disc can then be removed from the holder from the top or front. The holder has cut-out portions 724 and 726, which allow access to the discs.

In the inserted position, the slider member is held locked in the housing against the bias of the spring arrangement 709. For the purpose of locking a guide cage 720 is provided on the rear face of the slider member. The cage contains a displaceable and pivotable latch 716. A controlling and locking extension piece 718 of the latch 716 is guided into a locking position by a cam member 714, formed integrally with the base of the housing, when the slider member is inserted. Latch 716 is unlocked when the knob 706 is pushed toward the back of the housing and then released. The slider member is guided both on the base of the housing and by means of an inwardly projecting bar 736.

On the side of the housing opposite the bar 736 door element 728 is pivotably mounted. The door element is biased by a tension spring 730 to a closed position, shown by the solid lines in FIG. 15. The slider member carries a bar 734 on its upper side, set back towards the inside, having an end edge 732. End edge 732 hits the inside of the door element when the slider member locking mechanism is released, thus pushing open the door element. The door element is held open by resting against the outer face of the bar 734.

Variations and modifications will be apparent to those skilled in the art. The claims are intended to cover all variations and modifications that fall within the true spirit and scope of the invention.

I claim:

1. A container for accommodating at least one data storage medium, said container comprising:
   (a) a housing having a base wall, a top wall, two side walls, a rear wall, and an open front face opposite the rear wall, and having at least one compartment therein;
   (b) at least one slider member each for holding at least one data storage medium, the number of slider members at least corresponding to the number of compartments, said slider member being received in said compartment and being slidably movable into and out of the housing, the data storage medium being accessible for insertion or removal when the slider member is out of the housing;
   (c) locking means for retaining the slider member in the housing;
   (d) biasing means for ejecting the slider member from the housing when the locking means is released; and
   (e) door means separate and distinct from the slider member, said door means being movable between an open position and a closed position for opening and closing the open front face of the housing wherein the door means is moved to the closed position by the insertion of the slider member into the housing and is moved to the open position by the ejection of the slider member from the housing.

2. A container according to claim 1 wherein each slider member has its own associated door means.

3. A container according to claim 2 wherein the door means comprises a pair of pivotably mounted door elements, one of said pair of door elements pivoting in a first direction and the other of said pair of door elements simultaneously pivoting in a second direction when said door means is opening and when said door means is closing.

4. A container according to claim 3 wherein the slider member has one actuator member for each door element, each door element having a tongue member for engaging said actuator member, said actuator members actuating the door elements only at the beginning of the outward travel of the slider member for opening the door elements and at the end of the inward travel of the slider member for closing the door elements.

5. A container according to claim 1 further comprising coupling means for forming an operative connection between the door means and the slider member.

6. A container according to claim 5 wherein the coupling means is arranged to transfer a part of the stroke of the slider member to the door means at the beginning of ejection and at the end of insertion of the slider member.

7. A container according to claim 5 wherein the coupling means is a carriage that can be displaced parallel to the slider member.

8. A container according to claim 7 wherein the door means are mounted in the carriage.

9. A container according to claim 5 wherein the coupling means is a transfer lever.

10. A container according to claim 9 wherein the transfer lever is resiliently coupled with the door element.

11. A container according to claim 1 further comprising:

lever means pivotably mounted on said housing and pivotable between a position remote from said open front face and a position toward said open front face;

a spring attached at one end thereof to said door means and at the other end thereof to said lever means; and a control bar depending from said slider means;

said control bar engaging said lever means and pushing said lever means to said remote position when said slider member is inserted into said housing, thereby causing said spring to bias said door means towards a closed position, said control bar further engaging said lever means and pushing said lever means toward said open front face as said slider member is moved out of said housing, thereby compressing said spring and causing said spring to push said door means into, and to support said door means in, an open position.

12. A container according to claim 1 wherein said door means is directly pivotably connected to said housing.

* * * * *